(12) United States Patent
Kishimoto

(10) Patent No.: US 6,920,463 B2
(45) Date of Patent: Jul. 19, 2005

(54) PRODUCT INFORMATION PROVIDING APPARATUS, PRODUCT INFORMATION PROVIDING METHOD, AND PROGRAM AND RECORDING MEDIUM THEREFOR

(75) Inventor: Kazuya Kishimoto, Matcamoto (JP)

(73) Assignee: Seiko Epson Corporation, Tokyo (JP)

( * ) Notice: Subject to any disclaimer, the term of this patent is extended or adjusted under 35 U.S.C. 154(b) by 458 days.

(21) Appl. No.: 10/051,485

(22) Filed: Jan. 18, 2002

(65) Prior Publication Data
US 2002/0103562 A1 Aug. 1, 2002

(30) Foreign Application Priority Data
Jan. 26, 2001 (JP) ........................................ 2001-019040

(51) Int. Cl.⁷ .............................................. G06F 17/30
(52) U.S. Cl. ......................... 707/104.1; 707/3; 707/10; 709/203
(58) Field of Search ....................... 707/2–5, 10, 104.1; 705/26–28; 709/203

(56) References Cited

U.S. PATENT DOCUMENTS 6,594,692 B1 * 7/2003 Reisman .................... 709/219
6,625,581 B1 * 9/2003 Perkowski ................... 705/27

* cited by examiner

Primary Examiner—Christian D. Wilson
Assistant Examiner—Cheryl Lewis
(74) Attorney, Agent, or Firm—Rosalio Haro

(57) ABSTRACT

A product information providing apparatus is connected to a product information management apparatus having product information management data. The product information providing apparatus is capable of bidirectional communication via a communication network to a remote terminal, and includes receiving means for receiving from the remote terminal a request command requesting transmission of product information management data concerning a specified product via the communication network. Also, the product information providing apparatus includes obtaining means for obtaining from the product information management apparatus, in response to the request command, the product information management data concerning the specified product. The product information providing apparatus further includes transmitting means for transmitting to the remote terminal the obtained product information management data concerning the specified product.

29 Claims, 8 Drawing Sheets

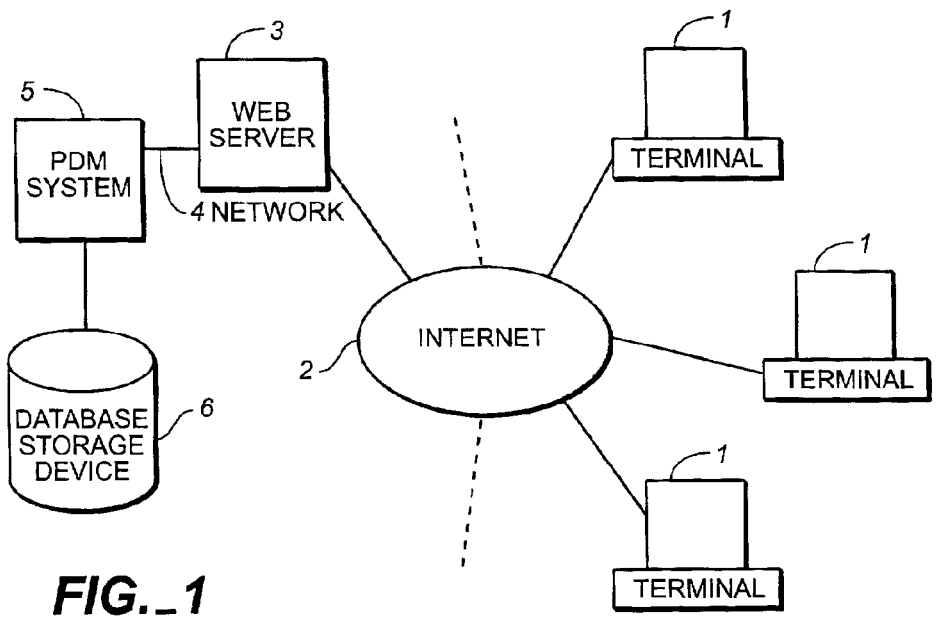
FIG._1
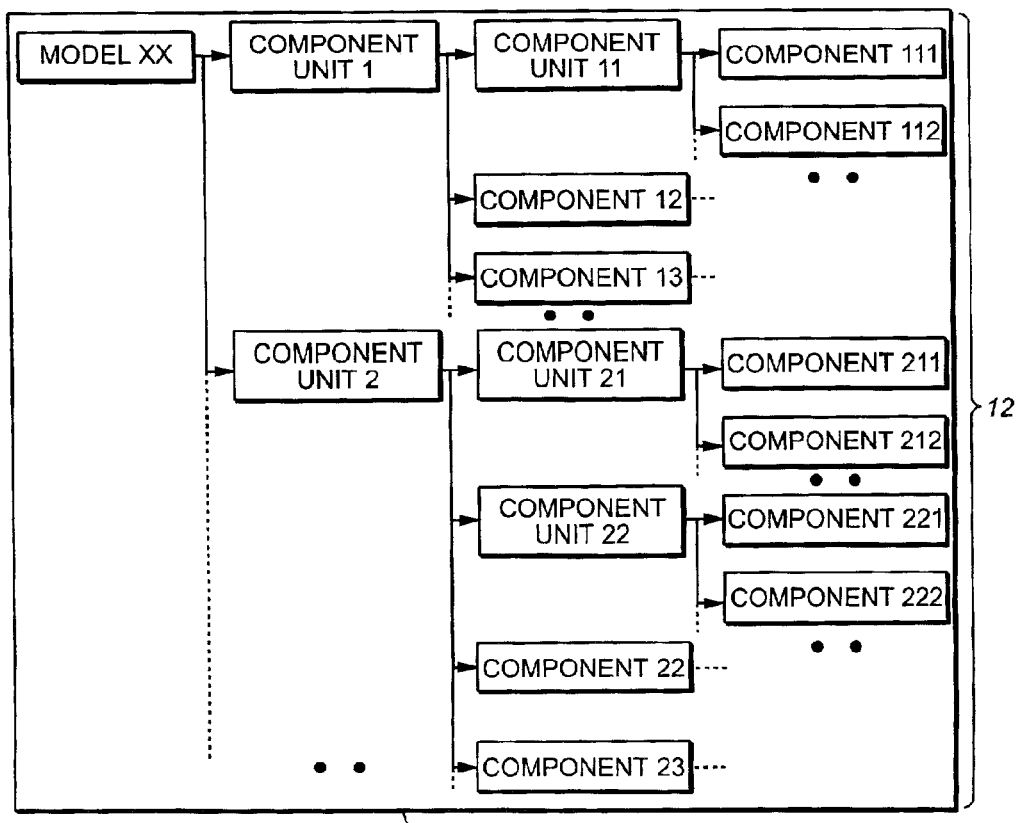
FIG._2

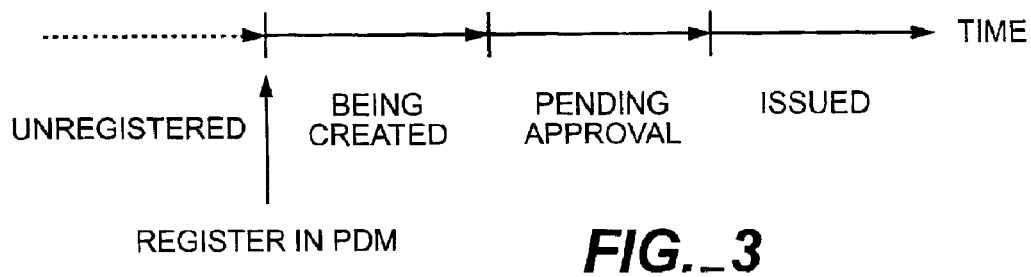
FIG._3
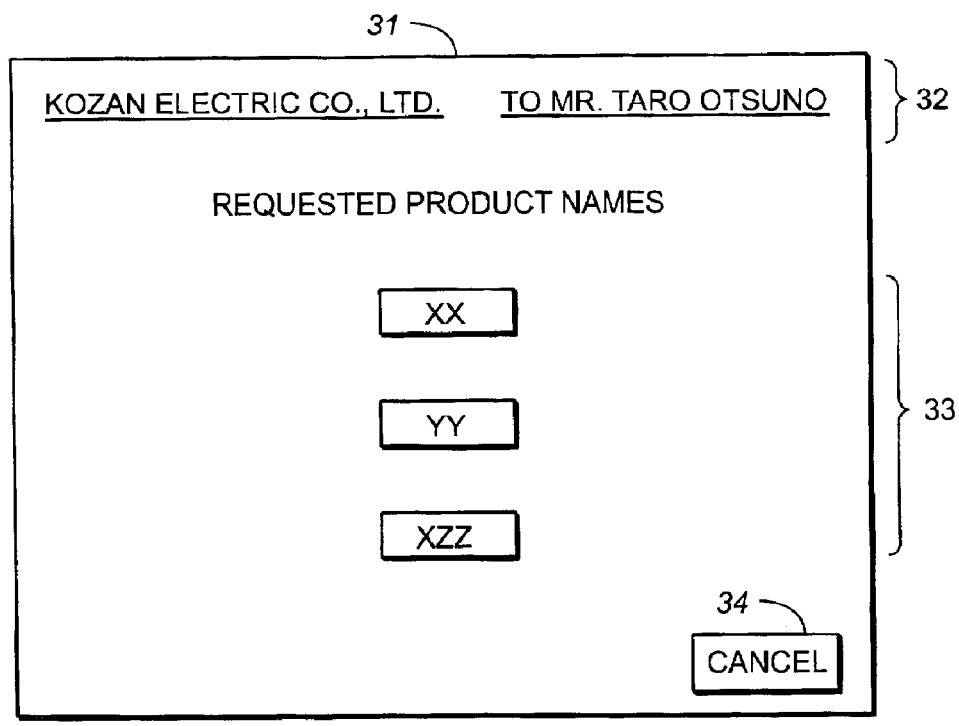
FIG._5

| DOCUMENT NAME | DEPARTMENT | STATUS | ⋮ ⋮ |
|---|---|---|---|
| PRODUCT CONFIGURATION TABLE | DESIGN SECTION 1 GROUP 1 | UNREGISTERED | ⋮ ⋮ |
| COMPONENT UNIT 1 ASSEMBLY DIAGRAM | TECHNICAL GROUP 2 | UNDER REVIEW | ⋮ ⋮ |
| COMPONENT UNIT 2 ASSEMBLY DIAGRAM | TECHNICAL GROUP 3 | UNDER REVIEW | ⋮ ⋮ |
| OUTLINE DRAWING | CUSTOMER | UNDER REVIEW | ⋮ ⋮ |
| COMPONENT 12 | TECHNICAL GROUP 2 | PENDING APPROVAL | ⋮ ⋮ |
| COMPONENT 13 | TECHNICAL GROUP 3 | ISSUED | ⋮ ⋮ |
| ⋮ | ⋮ | | |

21 — DOCUMENT NAME
22 — DEPARTMENT
23 — STATUS

*FIG._4*

| CUSTOMER NAME (41) | PERSON IN CHARGE (42) | PRODUCT 1 (43) | PRODUCT 2 (44) | PRODUCT 3 (45) | ·· |
|---|---|---|---|---|---|
| KOZAN ELECTRIC | TARO KONO | X1 | X11 | — | ·· |
| KOZAN ELECTRIC | TARO OTSUNO | XX | YY | XZZ | ·· |
| ·· | ·· | ·· | ·· | ·· | ·· |
| ·· | ·· | ·· | ·· | ·· | ·· |
| CHOGAWA TRADING | SABURO CHOGAWA | CC1 | CC2 | CC3 | ·· |
| ·· | ·· | ·· | ·· | ·· | ·· |
| ·· | ·· | ·· | ·· | ·· | ·· |
| ·· | ·· | ·· | ·· | ·· | ·· |

FIG._6

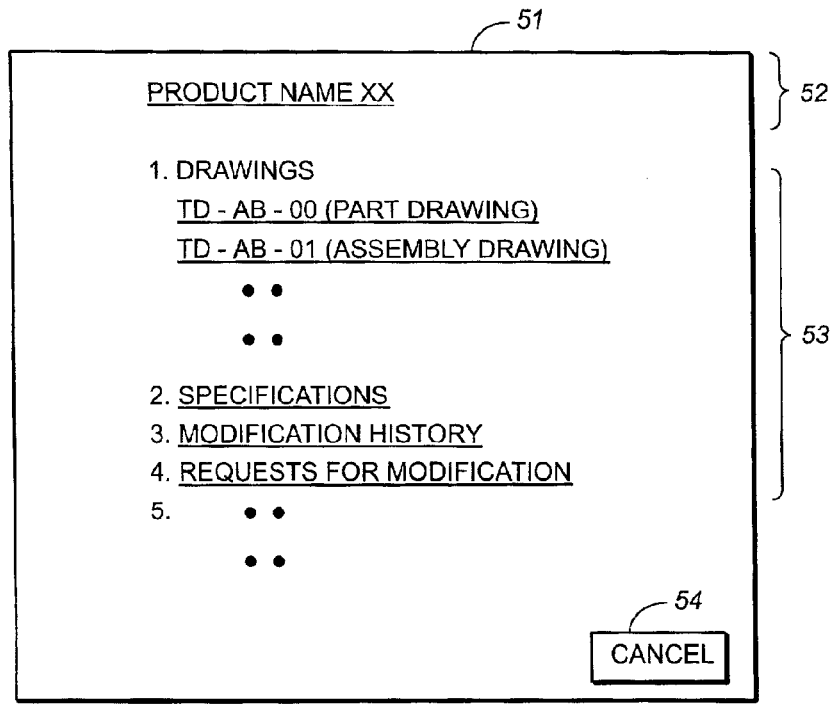
FIG._7
| COMPONENT NAME | DEPARTMENT IN CHARGE OF DESIGN | STATUS |
|---|---|---|
| COMPONENT a1 | DESIGN SECTION 1 GROUP 3 | UNREGISTERED |
| COMPONENT a2 | DESIGN SECTION 1 GROUP 4 | BEING CREATED |
| COMPONENT a21 | DESIGN SECTION 1 GROUP 4 | BEING CREATED |
| • • | • • | • • |
| • • | • • | • • |
| COMPONENT c3 | DESIGN SECTION 1 GROUP 5 | UNDER REVIEW |
| COMPONENT a4 | DESIGN SECTION 1 GROUP 5 | ISSUED |
| • • | • • | • • |
FIG._8

| SPECIFICATION NAME | RECORD DATE | STATUS |
|---|---|---|
| BASIC SPECIFICATION | 2000 / 12 / 12 | BEING CREATED |
| DETAILED SPECIFICATION | 2000 / 12 / 28 | BEING CREATED |
| ⋮ | ⋮ | |
| ⋮ | ⋮ | |

CANCEL

FIG._9

| REQUEST FOR MODIFICATION DATE | CONTENTS OF SPECIFICATION | ACTION |
|---|---|---|
| 2001 / 01 / 19 | DETAILED MODIFICATION | MODIFIED |
| 2001 / 01 / 20 | COMPONENT a1 | UNDER DISCUSSION |
| 2001 / 01 / 21 | COMPONENT d1 | UNDER DISCUSSION |
| ⋮ | ⋮ | ⋮ |
| ⋮ | ⋮ | ⋮ |

CANCEL

FIG._10

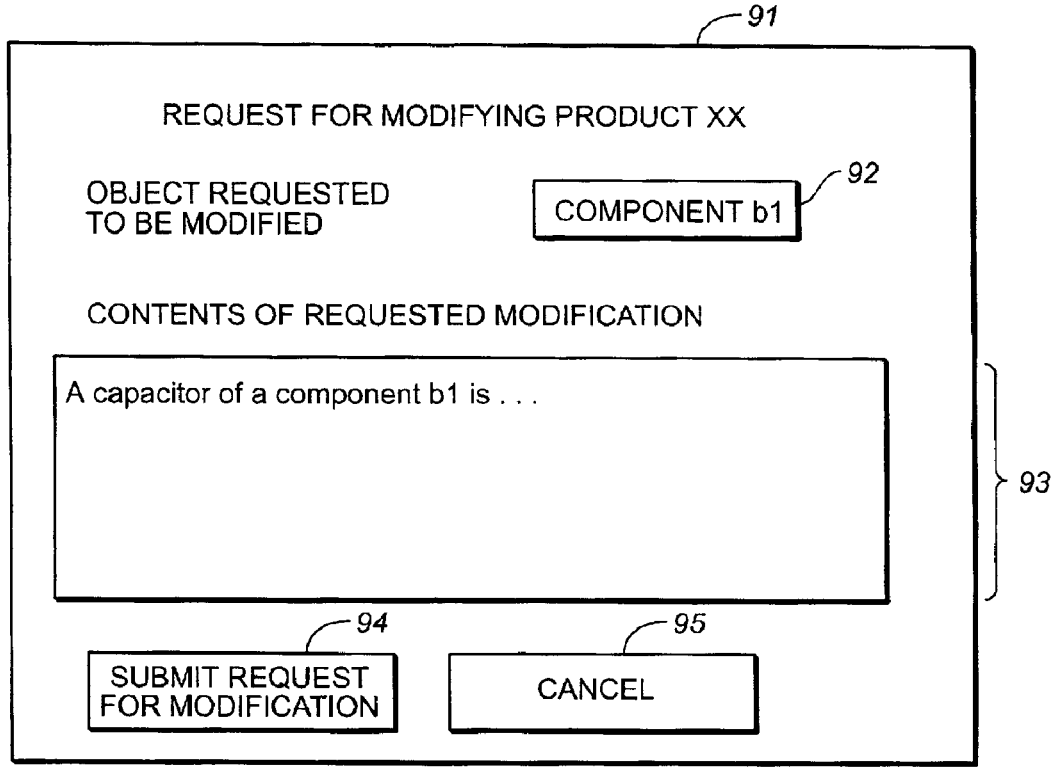
FIG._11
| LEVEL | RANGE |
|---|---|
| 1 | REFERENCE AND UPDATING PERMITTED |
| 2 | ONLY REFERENCE PERMITTED |
| 3 | REFERENCE PERMITTED ONLY TO CREATED DATA |
FIG._13

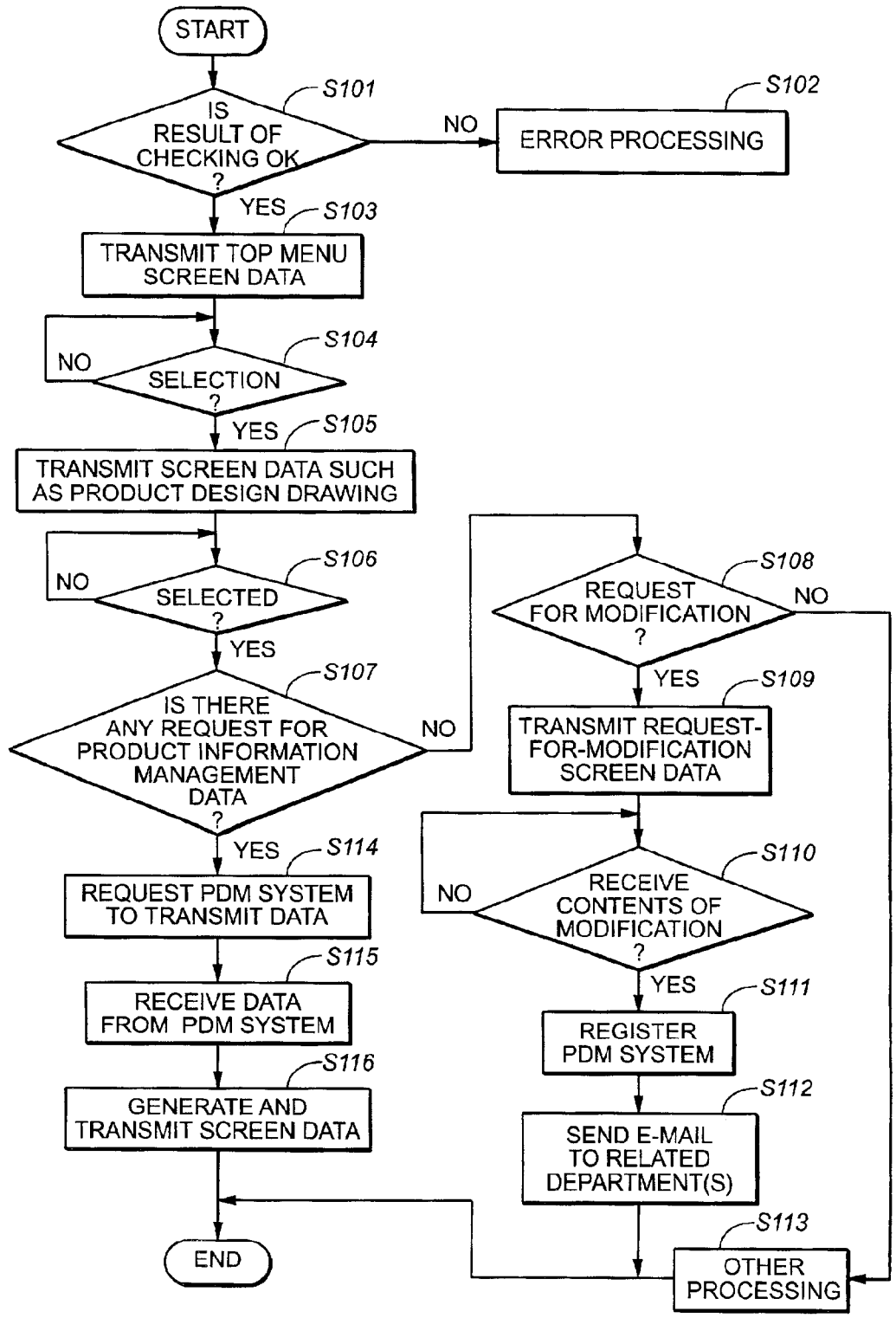
FIG._12

PRODUCT INFORMATION PROVIDING APPARATUS, PRODUCT INFORMATION PROVIDING METHOD, AND PROGRAM AND RECORDING MEDIUM THEREFOR

BACKGROUND OF THE INVENTION

1. Field of the Invention

The present invention relates to product information providing apparatuses, product information providing methods, and programs and recording media therefor, and more specifically, it relates to a product information providing apparatus, a product information providing method, and a program and recording medium therefor for providing product information management data in accordance with a data request from a customer through a communication network.

2. Description of the Related Art

Recently, various tools for managing product information or product configuration in product development have been developed. Among these tools, software for managing product information, that is, so-called PDM (Product Data Management), is a tool for managing product information concerning product development. A PDM system in which the software is installed is built on a computer network. A design engineer creates various documents and registers the documents in the PDM system. A development representative or engineer can refer to various pieces of information concerning products under development on a terminal. The information includes, for example, specifications and drawings created for products under development.

If the products under development are electronic devices, such as electronic components or semiconductor devices, an apparatus which uses the electronic devices is often developed and designed concurrently with the electronic devices. In particular, when a product under development is not for in-house use but for outside use, such as a custom-made product or a product specially made to order for a customer, the development of a design typically requires holding a large number of meetings with the customer and exchanging many documents with the customer before, at last, the final specification is confirmed.

Outside customers may frequently ask questions regarding the progress of a particular electronic device design and may make inquiries about the specification and the like.

OBJECTS OF THE INVENTION

Responses to inquiries from outside customers regarding the progress of design, specifications, and the like may be made by a simple procedure in which answers to the inquiries are confirmed by calling the in-house design department, and the answers or responses are then made to the customers over the phone. On the other hand, there are cases in which it is burdensome to confirm documents such as drawings using the PDM system, to make copies of the drawings, to fax the copies of the drawings, and to record the correspondence. It is therefore impossible to immediately respond accordingly to the inquiries.

When a customer wants to check the progress of a particular electronic device for reasons of a development schedule of another apparatus using the electronic device, the customer may not immediately receive an appropriate response. This may lead to a delay in development of the other apparatus.

SUMMARY OF THE INVENTION

Accordingly, it is an object of the present invention to enable a customer to easily confirm the progress of design or confirm a specification or the like.

A product information providing apparatus of the present invention is connected to a product information management apparatus having product information management data and being capable of transmitting/receiving data through a communication network. The product information providing apparatus includes receiving means for receiving a request command requesting transmission of the product information management data concerning a product through the communication network; product information management data obtaining means for obtaining, in response to the request command, the product information management data concerning the product from the product information management apparatus; and transmitting means for transmitting the product information management data concerning the product to a terminal which has transmitted the request command through the communication network.

Arranged as described above, the product information management data can be immediately and easily provided to the customer.

Preferably, the product information management data of the product information management apparatus includes status information in accordance with the progress of a design operation in each component of the product. Arranged as described above, the customer can also easily receive information concerning the progress of a design.

Preferably, the range of the product information management data to be transmitted from the transmitting means differs according to the customer transmitting the request command. Accordingly, services can be offered according to the customer.

A product information providing method of the present invention obtains product information management data from a product information management apparatus including the product information management data and transmits the product information management data through a communication network. The product information providing method includes a receiving step of receiving a request command requesting transmission of the product information management data concerning a product through the communication network; an obtaining step of obtaining, in response to the request command, the product information management data concerning the product from the product information management apparatus; and a transmitting step of transmitting the product information management data to a terminal which has transmitted the request command through the communication network.

Arranged as described above, the product information management data can be immediately and easily provided to the customer.

Preferably, the product information management data of the product information management apparatus includes status information in accordance with the progress of a design operation in each component of the product. Arranged as described above, the customer can also easily receive information concerning the progress of a design.

Preferably, the range of the product information management data to be transmitted differs according to the customer transmitting the request command. Accordingly, services can be offered according to the customer.

A program of the present invention causes a computer to perform the steps of a product information providing method of the present invention. Accordingly, the program implementing the product information providing method of the present invention can be distributed and provided through a communication network, a recording medium, or the like. By installing the program on a computer, the product information providing method of the present invention can be easily achieved.

A computer-readable recording medium of the present invention has recorded therein a program for causing a computer to perform the steps of a product information providing method of the present invention.

Arranged as described above, the program which can implement the product information providing method of the present invention is recorded on the medium. By installing the program on a computer, the product information providing method of the present invention can be easily achieved.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 1 is a system configuration diagram showing the overall configuration of an example of a system to which a product information management apparatus of the present invention is applied.

FIG. 2 illustrates an example of a screen displaying a product configuration tree diagram of products displayed on a screen of a terminal.

FIG. 3 illustrates status information.

FIG. 4 illustrates an example of data in a database storing status information in a PDM system.

FIG. 5 illustrates an example of a top menu screen which is first displayed when a customer gains access from a customer's terminal to a web server.

FIG. 6 illustrates an example of tabular-form customer product data stored in the web server.

FIG. 7 illustrates an example of a screen displayed when the customer using the terminal selects a certain product.

FIG. 8 illustrates an example of a screen displaying the status of each drawing selected by the customer using the terminal.

FIG. 9 illustrates an example of a screen displaying the status of each specification selected by the customer using the terminal.

FIG. 10 illustrates an example of a screen displaying an audit trail of requests for modification, which is selected by the customer using the terminal.

FIG. 11 illustrates an example of a request-for-modification screen displayed when the customer using the terminal makes a request for modification.

FIG. 12 is a flowchart showing a process performed by software of the web server.

FIG. 13 is a table of levels each defining the range of data that the customer can refer to or the like.

DESCRIPTION OF THE PREFERRED EMBODIMENTS

The present invention will be further illustrated with embodiments below, with reference to the drawings.

FIGS. 1 to 13 show an embodiment of the present invention.

FIG. 1 is a system configuration diagram showing the entire configuration of an example of a system to which a product information providing apparatus of the present invention is applied. Reference numeral 1 denotes a terminal such as a personal computer used by a customer or the like. Reference numeral 2 denotes a communication network such as the Internet. Reference numeral 3 denotes a network, or web, server. A plurality of terminals 1 is connected to the web server 3 through the Internet 2. Network access software, such web browser software, is installed in each terminal 1, and hence each terminal 1 can gain access to the web server 3 through the Internet 2. The web server 3 can transmit data to each terminal 1, and/or receive data from each terminal 1.

The web server 3 is connected to a Product Data Management, PDM, system 5 through a network 4. PDM system 5 is a product information management apparatus. PDM system 5 is preferably an in-house system of a product designing company or a manufacturing company. A database storage device 6 is connected to the PDM system 5. Although the PDM system 5 is indicated by a single block, the PDM system 5 includes a communication network system and is connected to a large number of in-house terminals. Data for specifications and design drawings for products under in-house development and modification history of the specifications are transferred from in-house terminals to the storage device 6 of the PDM system 5. Since the data can be accessed by the in-house terminals, it is possible to make reference to the progress of a design for a product under development at a design phase. Data used by the PDM system 5 is stored in a database in the storage device 6. The database may be a so-called relational database or may simply include data files in a simple file format.

FIG. 2 shows an example of a screen displayed on the display of a terminal for displaying a product configuration tree diagram of products. The screen is not only displayed on a display of an in-house terminal through the in-house network system but may also be displayed on a display of the customer's remote terminal 1 when the customer accesses the web server 3 through the Internet 2. This will be described below.

The PDM system 5 stores, in the database storage device 6, product information management data for a product which is being designed or developed or for a designed or developed product. The product information management data is managed by the PDM system software. The product information management data includes data such as product specifications and drawings at a design phase. Also, the data includes specifications or drawings of part of a product which has already been designed.

Referring to FIG. 2, a window 11 which is displayed on the display of the terminal connected to the Internet 2, or other network for accessing PDM system 5, displays may show, for example, that a certain electronic device model "XX" contains "component unit 1", "component unit 2", and the like. As represented by reference numeral 12, the configuration information for the model "XX" is displayed using a tree structure. The "component unit 1" further contains lower "component unit 11", "component 12", "component 13", and the like. Similarly, the "component unit 11" contains lower "component 111", "component 112", and the like. As in the case of "component unit 1", the "component unit 2" is in a so-called parent-child relationship with many components, which is indicated by a tree structure. A drawing, or other additional information, is linked to each component on the screen. That is, when any component is selected by clicking, a drawing of the component and/or other additional component information is displayed. In FIG. 2, a menu bar, a tool bar, and the like which are generally provided at the top of the window by browser software are omitted in order to simplify the drawing.

The same applies to examples of screens described below.

By using a terminal with access to PDM system 5, a designer, or other user, may look at the screen and perform operations, and hence the designer can register documents such as text and drawings or refer to information for various parts in the documents such as the physical size and electric characteristics of each component and the like in order to confirm the information.

A sample case is discussed below for explanation purposes. In the present example, a product development trustee company (such as a manufacturer company) which has the PDM system 5 is entrusted with the development of a design for an electronic device by a customer, and the manufacturer company holds various meetings and exchanges documents and the like with the customer, whereby the product is designed and developed. In response to a first development request, the manufacturer company decides to use the PDM system 5 and registers a development code, or the like, in the PDM system 5. When a plurality of engineers starts designing the product, work or operations for creating design drawings are registered in the PDM system 5 for the purpose of management. In the PDM system 5, the progress of the registered design operations such as creation of a part drawing is managed as status information.

FIG. 3 illustrates exemplary status information. In FIG. 3, the status information indicates four states in accordance with the flow of time. The four states are namely: "unregistered"; "being created"; "pending approval"; and "issued". The state "unregistered" is a state in which no operations have been registered. For example, when there has been an instruction to draw a part drawing but the drawing operation has not yet been registered in the PDM system 5, the state is indicated as "unregistered". It means that an engineer in charge of creating the part drawing has not yet started creating the drawing.

The state "being created" indicates a state in which the operation has been registered in the PDM system 5, that is, the engineer in charge has started the operation. However, the state "being created" does not mean that the operation is completed. For example, the drawing may have been started, the drawing is not yet completed and confirmed.

The state "pending approval" indicates a state in which the creation is substantially completed but has not yet been approved by a supervisor or the like, so that the approval of the creation has been requested.

The state "issued" indicates that the approval has been given and that the contents of the drawing have been confirmed. FIG. 3 shows only an example of status information. Status information can be defined or expressed in various ways according to definitions, or target milestones, of the operational progress. In general, status information indicating the progress is automatically managed by a work-flow management system which operates in connection with, or which is included in, the PDM system 5. In this case, the work-flow management system automatically registers or updates status information from time to time during each operation. Alternatively, instead of using the work-flow management system, an executor of each operation can manually register or update status information.

The progress information is stored as status information with respect to each design operation in the database of the PDM system 5. For example, design operations may include creation of a "product configuration table", creation of an "outline drawing", and the like. Status information is stored by unit of operation. In accordance with the progress of each operation registered in the PDM system 5, the status information is updated.

FIG. 4 illustrates a data example of a database in which the status information in the PDM system is stored as table data in the storage device 6. For the sake of clarity, only three item, or table categories, are shown in FIG. 4. Namely, categories for a document name item 21, a department item 22, and a status information item 23 are shown, and all other items are omitted.

Associated with each document name item 21, the table stores a department in charge of developing the document in the item 22 and status information in the item 23. As shown in the exemplary table of FIG. 4, the document named "product configuration table" (listed under document name item 21) is to be created by the department named "design section 1 group 1" (listed under department item 22) and its status information indicates that the document is current "unregistered" (as shown under status item 23). Similarly, the document named "component unit 1 assembly drawing" is to be created by the department named "technical group 2", and its status information indicates that the "component unit 1" document is currently "under review". Accordingly, the status information item 23 of FIG. 4 indicating the creation progress of various documents related to the electronic device model "XX" of FIG. 2, which a customer has requested to be developed and designed. Additional information regarding the documents related to electronic device model "XX" is stored and updated in the table of FIG. 4.

FIG. 5 shows an example of a top menu screen first displayed when the customer who requested the design of electronic device model "XX" gains access to PDM system 5 from any of terminals 1. It is to be understood that terminals 1 are the customer's own computers who gain access to the web server 3 through the Internet 2 in order to confirm the progress of the development of the design for the product that he or she is in charge of, i.e. device model "XX" in the present example. The customer, i.e. the person in charge at the customer side, inputs a predetermined user name, namely a provided identification code and a password, and thereby accesses, namely logs on to, web server 3. When the web server 3 and a customer's terminal 1 are interconnected by a leased line, such authentication may not be unnecessary.

Web server 3 provides data corresponding to requested products for each person in charge of the requested product at the customer side. The web server 3 transmits screen data for displaying a product list for the person in charge at the customer side who has accessed the web server 3, on a screen of the terminal of the person in charge. Referring to FIG. 5, reference numeral 31 denotes a window display frame. In a screen top portion 32, item fields "customer name" (illustratively showing customer "Kozan Electric Co., LTD") and "name of person in charge" (illustratively showing person "Mr. Taro Otsuno") are provided for confirmation, and the contents thereof are displayed. In a lower portion 33, products requested by the person in charge are displayed on the screen in the form of a list. Three products "XX", "YY", and "XZZ" are displayed in a so-called button-selection format on the display screen by browser software. When any one of the buttons ("XX", "YY", or "XZZ") is selected by clicking with a pointing device such as a computer mouse, the details of the selected product are displayed. Reference numeral 34 denotes a cancel button. To cancel the screen, the cancel button 34 is clicked.

FIG. 6 shows an example of a data structure of customer product data stored in the web server 3. In FIG. 6, the example is in a table form. The table has items including a customer name category 41, a person in charge category 42, product 1 category 43, product 2 category 44, product 3 category 45, and so on. For example, under the person in charge category 42, the table shows that Mr. "Taro Otsuno" (associated with customer "Kozan Electric", as indicated in category 41) is in charge of the products 1 to 3, namely, products "XX", "YY", and "XZZ". As shown in FIG. 5, when Mr. "Taro Otsuno" of customer "Kozan Electric" gains access from any terminal 1 to the web server 3, a list of products assigned to Mr. Otsuno is displayed based on the table data shown in FIG. 6.

FIG. 7 shows an example of a screen displayed when an operator of a terminal 1 at the customer side selects the button for the product "XX" on the screen of FIG. 5. In a top portion 52 of a window 51, the product name selected on the screen of FIG. 5 is displayed. In a lower portion 53 of the window, or frame, 51, detail items associated with product "XX", such as a drawing, specification, modification history, request for modification, and the like, are displayed. The item "drawing" is subdivided into a "part drawing", an "assembly drawing", and the like in a list form. These item portions form so-called buttons on the browser screen. When the drawing "TD-AB-00 ("part drawing") is clicked and selected, a window 61 shown in FIG. 8 is displayed. Reference numeral 54 in FIG. 7 denotes a cancel button.

A so-called link, i.e. a software association between computer files, records, etc., is inserted at the product name displayed in the upper portion 52. When the product name is clicked at the terminal 1, the product configuration tree shown in FIG. 2 is displayed. When the operator of the terminal 1 clicks, i.e. selects, a component displayed in the component configuration tree diagram of FIG. 2, a document such as a drawing related to the selected component is displayed. Accordingly, the operator can confirm the contents of the document. Furthermore, a link is also inserted at a displayed portion of each item (field) displayed in the lower portion 53 of FIG. 7. By clicking and selecting the displayed portion, a different screen is displayed.

Alternatively, although this is not shown in FIG. 7, for each item such as the drawing or the specification in FIG. 7, documents including drawings and specifications can be displayed in a list format. By clicking a document displayed on the list, the document can be displayed.

FIG. 8 shows an example of a screen displaying the status of a document selected by a customer at the terminal. The screen is displayed when the operator of the terminal 1 at the customer side selects the field "TD-AB-00 (part drawing)" on the screen shown in FIG. 7. When the field is clicked, the web server 3 gives a command to the PDM system 5 to search for drawing data for the product since the product or model was previously made known. The web server 3 receives the search result. As a result, in accordance with items displayed in a top portion 62, the window 61 shown in FIG. 8 displays the names of components illustrated in the selected part drawing, the departments in charge of designing the components, and status. For example, "component a1" is assigned to the department "design section 1 group 3" and its status is "unregistered". Similarly, "component a2" is assigned to the department "design section 1 group 4" and its status is "being created". Reference numeral 64 denotes a cancel button.

FIG. 9 shows an example of a screen displaying the status of a specification selected by the operator of the terminal 1. The screen is displayed, for example, when the customer using the terminal 1 selects the field "specification" on the screen displayed in FIG. 7. When the field is clicked, the web server 3 gives a command to the PDM system 5 to search for specification data for the product since the product or model was previously made known, and the web server 3 receives the search result. As a result, in accordance with items displayed in an upper portion 72 of a window 71, record date of each specification is displayed in a lower portion 73. For example, "basic specification" is registered on "Dec. 12, 2000", and its status indicates that it is "being created". Reference numeral 74 denotes a cancel button. When a specification has no recorded date data, it means that the specification has not yet been registered.

FIG. 10 shows an example of a screen displaying a history of requests for modification in response to selection by a customer who is the operator of the terminal 1. For example, the screen is displayed when the operator of the terminal 1 selects the field "modification history" on the screen shown in FIG. 7. When the field is clicked, the web server 3 gives a command to the PDM system 5 to search for modification history data for the product since the product or model was previously made known, and the web server 3 receives the search result. As a result, in accordance with items displayed in an upper portion 82 of a window 81, the date of each request for modification is displayed in a lower portion 83. For example, a request for modification of a "detailed specification" is dated "Jan. 19, 2001", and its status information under the item "action" indicates that the specification is "modified". Similarly, a request for modification of "component a1" is dated "Jan. 20, 2001" and the request for modification is "under discussion". Reference numeral 84 denotes a cancel button.

When the operator wants to see the specific contents of a request for modification, the operator clicks the contents of modification displayed in the lower portion 83, whereby the contents of a modification request form are displayed. For example, as described hereinafter, the contents of a request sent online or sent by fax can be displayed. In particular, a request sent by fax is stored as image data, and hence the request is displayed as the image data.

In addition to the descriptions illustrated with reference to FIGS. 8, 9, and 10, the scheduled end date and the schedule of each project can be displayed together with the progress of each project at the present moment.

FIG. 11 shows an example of a request-for-modification screen displayed when a customer using the terminal makes a request for modification. For example, the screen is displayed when the operator of the terminal 1 selects the field "request for modification" on the screen shown in FIG. 7. In an upper portion of a window 91, a field 92 for inputting an object requested to be modified is displayed. In the field 92, the operator inputs an object requested to be modified. In this example, "component b1" is requested to be modified. A lower portion 93 is a field in which the specific contents of the request for modification are input in sentence(s). Reference numeral 94 denotes a button to be pressed for making a request for modification. When the button 94 is clicked, the request for modification is transmitted to the web server 3 via the Internet 2. Since the web server 3 already has the name of the customer and the person in charge regarding the request for modification, the request for modification and its related data are transmitted to the PDM system 5, and the data is thereby registered and managed.

Reference numeral 95 denotes a cancel button.

The above-described screen is displayed when the terminal 1 accesses the Internet 2. The processing performed by the web server 3 is shown in FIG. 12.

FIG. 12 is a flowchart showing a process executed by software of the web server 3 when the web server 3 is accessed via the Internet 2. The following communication deals with a product under development, and thus the data therein is confidential. Thus, communication is performed in a secure environment using, for example, http protocol.

When the web server 3 is accessed via the Internet 2, the input customer ID code and password are checked to determine whether the access is gained by a valid customer (step 101, which will be referred to as "S101" hereinafter). If the access is not from a valid customer, that is, if the check result is negative in S101, it is determined that the access is invalid. The process proceeds to error processing in S102. In the error processing, general error processing is performed, such as notifying the person who has accessed the web server 3 that the access is invalid.

If the determination in step S101 is affirmative, the process transmits top menu screen data for displaying, on the terminal 1, a list of products which are requested by, or associated with, the person who has accessed the web server 3 (S103). The top menu screen is the screen shown in FIG. 5.

If a product is selected from the product list shown in FIG. 5 (if the determination in step S104 is affirmative), the process transmits list screen data for displaying design drawings and the like for the product shown in FIG. 7 (S105). If the operator of the terminal 1 makes selection on the screen shown in FIG. 7, the determination in step S106 is affirmative. If the operator selects information concerning the present state, such as a drawing, specification, modification history, and the like, it means that the operator's selection is a request for transmission of data which is stored in and managed by the PDM system 5 to the terminal 1, whereby the operator can refer to the data. Thus, the selection is regarded as a data request command requesting product information management data, and the determination in step S107 is affirmative. If the determination in step S107 is affirmative, the web server 3 transmits the data request command to the PDM system 5 through the network 4 (S114).

After the transmission, the process receives and obtains response data from the PDM system 5 in accordance with the data request (S115). The web server 5 generates and transmits screen data for displaying the response data on the terminal 1 which has made the data request (S116). When transmitting the response data to the web server 3, the PDM system 5 not only transmits the response data to the web server 3 but also generates screen data to the necessary extent and transmits the generated screen data and the response data to the web server 3.

If the determination in step S107 is negative, the process checks whether or not the request is for modification (S108). If the request is for modification, the determination in step S108 is affirmative. Screen data for inputting modification request as shown in FIG. 11 are transmitted (S109). The process transmits request-for-modification screen data and checks whether or not data for the contents to be modified is received (S110). If the contents to be modified are received in step S110 (if the determination in step S110 is affirmative), the process transmits a command so that the contents of the request are registered in the PDM system 5 (S111).

When the registration is completed, the process notifies, by e-mail, the staff of the department(s) related to the design of the product to which the request for modification has been made (S112).

If the determination in step S108 is negative, that is, if the request is not for modification, the process performs other processing related to the selection (S113).

In the above example, the web server 3 is described as a unit independent of the PDM system 5. However, in terms of software, the function of the web server 3 can be integrated with the PDM system 5.

As shown in FIG. 13, the range of data to be provided can be defined according to customer, and data can be provided only within the defined range. FIG. 13 is a table showing levels for defining the range of data which can be referred to according to customer. For example, in accordance with the level of a customer, a customer at level 1 can update and refer to data in the PDM system 5. A customer at level 2 can only refer to data in the PDM system 5. A customer at level 3 can only refer to created data. The level is set according to customer, and the allowable range is defined in accordance with the set level. Within the range, the web server 3 provides data. For example, when level data shown in FIG. 13 is used, a particular customer can refer to and update all the product information management data in the PDM system 5. On the other hand, another customer can only refer to predetermined drawings and specifications.

As described above, with the foregoing arrangement, when a person accesses the web server 3 in order to confirm product information for a product under development via a communication line, the person is authenticated. For only the authenticated person, the web server 3 obtains information for the product handled by the person from the PDM system and provides a response to the person. The web server 3 accesses the database of the PDM system 5 and obtains data. To the person who has accessed the web server 3, the web server 3 not only transmits document data for a drawing or a specification out of various documents but also obtains and transmits data for a history of requests for design modification from the PDM system 5. Furthermore, a request for design modification can be made via the communication line.

The entirety or a part of a program for implementing the above-described operation is recorded or stored in a portable medium such as a floppy disk, a CDROM, or the like, or in a storage device such as a hard disk. The program is read by a computer, and the entirety or a part of the operation is performed. Alternatively, the entirety or a part of the program can be distributed or provided through a communication network. A user can download the program through the communication network and install the program on a computer. Alternatively, the user can install the program on the computer from a recording medium. As a result, the product information providing method of the present invention can be easily achieved.

Thus, a customer can always refer to product information for a product the customer has requested to be designed. It becomes very convenient for both a manufacturer who develops the product and the customer.

Although the preferred embodiment of the present invention has been described, various modifications and changes can be made at present and in future within the spirit and scope of the present invention. Accordingly, equivalent arrangements made by those skilled in the art are considered to be within the scope of the present invention.

[Advantages]

As described above, according to the present invention, information such as the progress of design and confirmation of specifications can be easily provided to a customer or the like.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A product information providing apparatus capable of transmitting/receiving data through a communication network, comprising:
   a communication link to a product information management apparatus having product information management data;
   a receiver for receiving, through said conununication network from a remote terminal, a request coinniand requesting transmission of product information management data related to a specified product comnrised of a plurality of sub-components;
   wherein said communication link is effective for obtaining from said product information management apparatus, in response to said request command, the information management data related to said specified product and its sub-components; and
   a transmitter for transmitting the product information management data related to at least one of said sub-components to said remote terminal.

2. A product information providing apparatus according to claim 1, wherein said product information management data of said product information management apparatus includes completion status information regarding the incremental progress of a multi-stage construction operation.

3. A product information providing apparatus according to claim 1, wherein, depending on the identification of the user of said remote terminal, the remote terminal is optionally provided with viewable only information management data, or viewable and editable data to permit the remote terminal to freely submit design changes to the information management data of the specified product and its sub-comnonents, or viewable and partially editable data to permit the remote terminal to submit design changes only to information management data previously submitted by the identified user.

4. The product information providing apparatus of claim 1, wherein said specified product is a technical design drawing comprised of a plurality of other sub-drawings.

5. The product information providing apparatus of claim 1, wherein said specified product is a device comprised of a plurality of other device sub-components.

6. The product information providing apparatus of claim 1, wherein said product information management data includes a pictorial timeline of completed tasks and tasks scheduled for completion.

7. The product information providing apparatus of claim 1, wherein said product information management data includes at least one of design progress information, or completion status of accepted submissions of design modifications, or specification of work department in charge of sub-components within said specified product, or a listing of individual persons in charge of sub-components within said specified product.

8. The product information providing apparatus of claim 1, being further effective for accepting, from said remote terminal, design or manufacturing changes to said specified product, and for incorporating said changes to an appropriate one of a design schedule or manufacturing schedule.

9. A product information providing method for obtaining product information management data from a product information management apparatus having said product information management data, said product information providing method being further effective for transmitting said product information management data through a communication network, said method comprising:
   a receiving step of receiving, from a remote terminal through said communication network, a request command requesting transmission of product information management data concerning a specified product comprised of a plurality of sub-components;
   an obtaining step of obtaining from said product information management apparatus, the information management data concerning said specified product and its sub-comnonents in response to said request command; and
   a transmitting step of transmitting to said remote terminal the obtained product information management data concerning at least one of said sub-components.

10. A product information providing method according to claim 9, wherein said product information management data of said product information management apparatus includes completion status information regarding the incremental progress of a multi-stage construction operation.

11. A product information providing method according to claim 9, wherein depending on the identification of the user of said remote terminal, the remote terminal is optionally provided with viewable only product information management data, or viewable and editable data to permit the remote terminal to freely submit design chances to the information management data of the specified product and its sub-components, or viewable and partially editable data to permit the remote terminal to submit design changes only to information management data previously submitted by the identified user.

12. A computer program for causing a computer to execute the method steps as set forth in claim 9.

13. A computer-readable recording medium having recorded therein the computer program as set forth in claim 12.

14. The product information providing method of claim 9, wherein said specified product is a technical design drawing comprised of a plurality of other sub-drawings.

15. The product information providing method of claim 9, wherein said specified product is a device comprised of a plurality of other device sub-components.

16. The product information providing method of claim 9, wherein said product information management data includes a pictorial timeline of completed tasks and tasks scheduled for completion.

17. The product information providing method of claim 9, wherein said product information management data includes at least one of design progress information, or completion status of accepted submissions of design modifications, or specification of work department in charge of sub-components within said specified product, or a listing of individual persons in charge of sub-components within said specified product.

18. The product information providing method of claim 9, further including an accepting step for accepting, from said remote terminal, design or manufacturing changes to said specified product, and for incorporating said changes to an appropriate one of a design schedule or manufacturing schedule.

19. A product information providing apparatus capable of transmitting/receiving data through a communication network, comprising:

a receiver for receiving, through said communication network from a remote terminal, a request command requesting transmission of product information management data related to a specified product, wherein said product information management data includes at least one of design progress information, or design drawings, or completion status of accepted submissions of design modifications, or specification of work department in charge of sub-components within said product, or a listing of individual persons in charge of sub-components within said product;

wherein in response to said request command, said product information providing apparatus transmits the requested product information management data to said remote terminal.

20. The product information providing apparatus of claim 19, being further effective for accepting, from said remote terminal, design or manufacturing changes to said specified product, and for incorporating said changes to an appropriate one of a design schedule or manufacturing schedule.

21. The product information providing apparatus of claim 20, being further effective for associating the identification of the user of the remote terminal with said changes; and wherein as determined from the identification of the user of said remote terminal, said product information providing apparatus limits access to said identified user to one of only viewing said product information management data, viewing and editing a previously predetermined part of said product information management data, or viewing said product information management data but editing only product information data associated with said identified user.

22. The product information providing apparatus of claim 19, wherein said specified product is comprised of a plurality of sub-components, and said product information management data relates to said specified product and its individual plurality of sub-components.

23. A product information providing method for transmitting/receiving data through a communication network, comprising:

a receiving, through said communication network from a remote terminal, a request command requesting transmission of product information management data related to a specified product, wherein said product information management data includes at least one of design progress information, or design drawings, or completion status of accepted submissions of design modifications, or specification of work department in charge of sub-components within said product, or a listing of individual persons in charge of sub-components within said product;

in response to said request command, transmitting the requested product information management data to said remote terminal.

24. The product information providing method of claim 23, further including;

accepting, from said remote terminal, design or manufacturing changes to said specified product; and incorporating said changes to an appropriate one of a design schedule or manufacturing schedule.

25. The product information providing method of claim 24, further including:

associating the identification of the user of the remote terminal with said changes; and limiting the access of the identified user to one of only viewing said product information management data, viewing and editing a previously set part of said product information management data, or viewing said product information management data but editing only product information data associated with said identified user.

26. The product information providing method of claim 23, wherein said specified product is comprised of a plurality of sub-components, and said product information management data relates to said specified product and its individual plurality of sub-components.

27. A product information providing apparatus capable of transmitting/receiving data through a communication network, comprising:

a communication link to a product information management apparatus having product information management data;

a receiver for receiving, through said communication network from a remote terminal, a request command requesting transmission of product information management data related to a specified product;

wherein said communication link is effective for obtaining from said product information management apparatus, in response to said request command, the information management data related to said specified product including at least one of design progress information, or completion status of accepted submissions of design modifications, or specification of work department in charge of sub-components within said specified product, or a listing of individual persons in charge of sub-components within said specified product; and a transmitter for transmitting the product information management data related to said specified product to said remote terminal.

28. A product information providing apparatus capable of transmitting/receiving data through a communication network, comprising:

a communication link to a product information management apparatus having product information management data;

a receiver for receiving, through said communication network from a remote terminal, a request command requesting transmission of product information management data related to a specified product;

wherein said communication link is effective for obtaining from said product information management apparatus, in response to said request command, the information management data related to said specified product; and a transmitter for communication with said remote terminal, wherein depending on the identification of a user of said remote terminal, the remote terminal is optionally provided with viewable only information management data, or viewable and editable data to permit the remote terminal to freely to submit design changes to the information management data of the specified product and its sub-components, or viewable and partially editable data to permit the remote terminal to submit design changes only to information management data previously submitted by the identified user.

29. The product information providing method of claim 28, wherein said product information management data includes at least one of design progress information, or completion status of accepted submissions of design modifications, or specification of work department in charge of sub-components within said specified product, or a listing of individual persons in charge of sub-components within said specified product.

* * * * *

UNITED STATES PATENT AND TRADEMARK OFFICE
CERTIFICATE OF CORRECTION

PATENT NO.    : 6,920,463 B2
DATED         : July 19, 2005
INVENTOR(S)   : Kazuya Kishimoto It is certified that error appears in the above-identified patent and that said Letters Patent is hereby corrected as shown below:

<u>Column 11,</u>
Line 22, change "coinniand" to -- command --.

Signed and Sealed this

Seventh Day of March, 2006

JON W. DUDAS
*Director of the United States Patent and Trademark Office*